Oct. 10, 1933. E. S. HALSEY 1,929,583
APPARATUS FOR SUPPLYING COOLED DRINKING WATER
Filed July 28, 1930 2 Sheets-Sheet 1
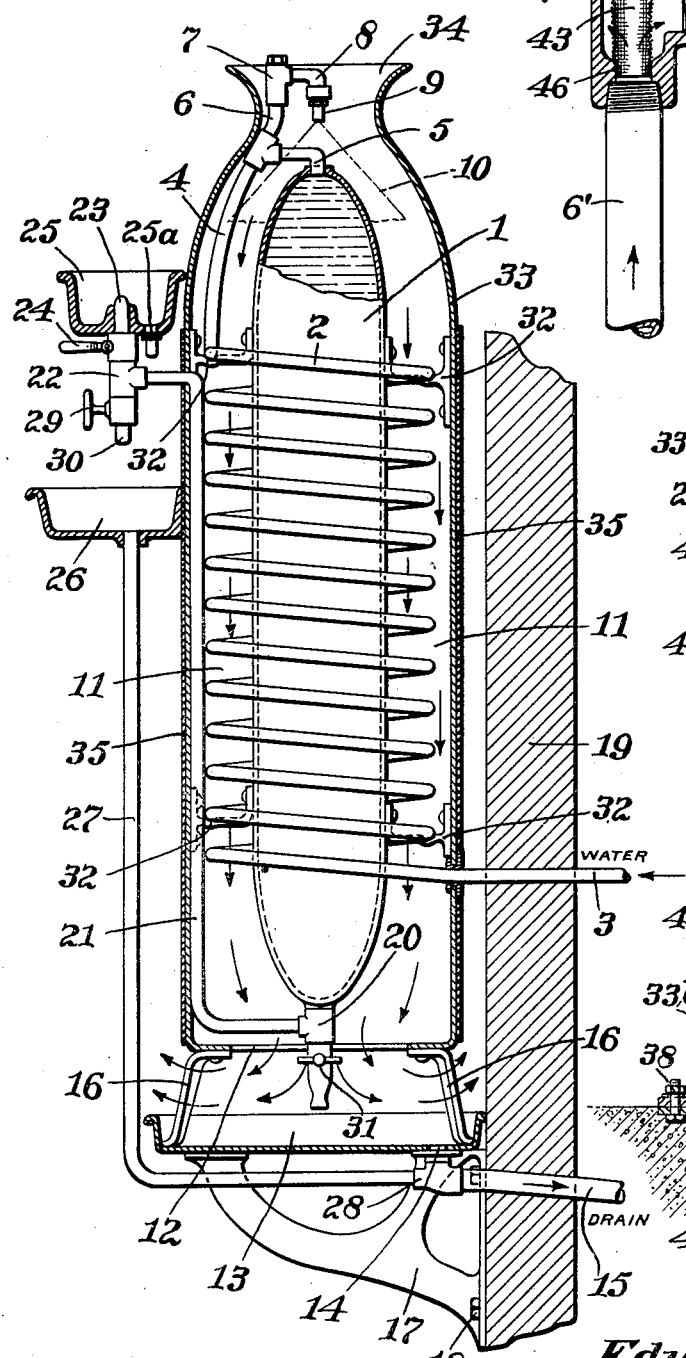
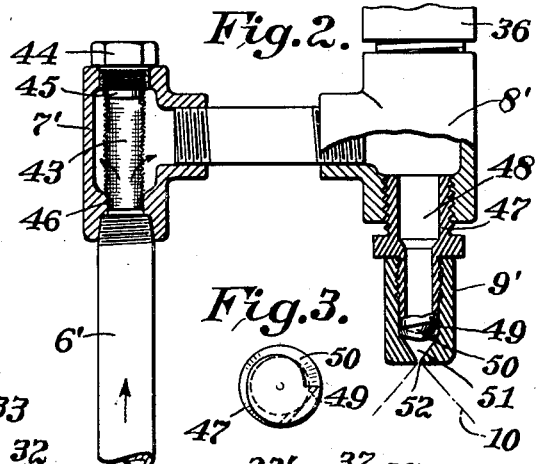
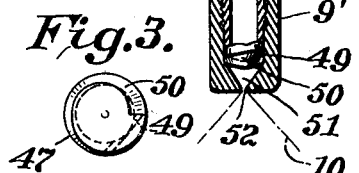
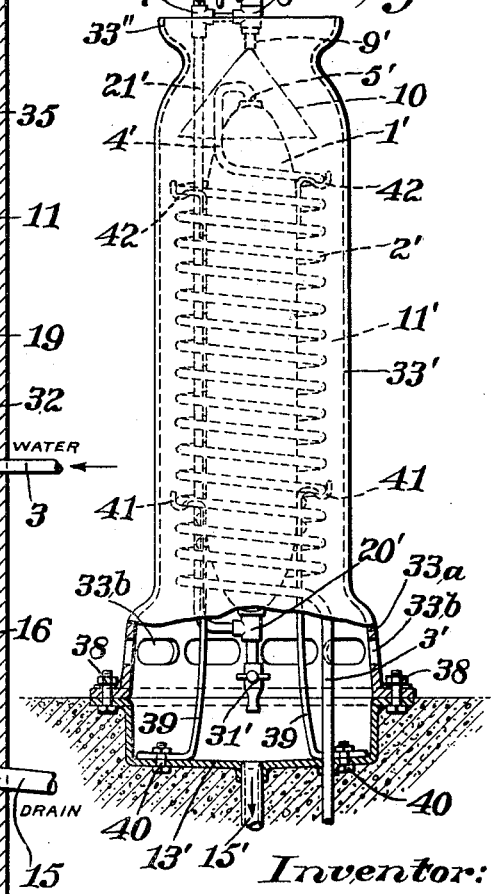
Inventor:
Edward S. Halsey,
By Spear, Middleton, Donaldson & Hull Attys.

Oct. 10, 1933.  E. S. HALSEY  1,929,583
APPARATUS FOR SUPPLYING COOLED DRINKING WATER
Filed July 28, 1930  2 Sheets-Sheet 2
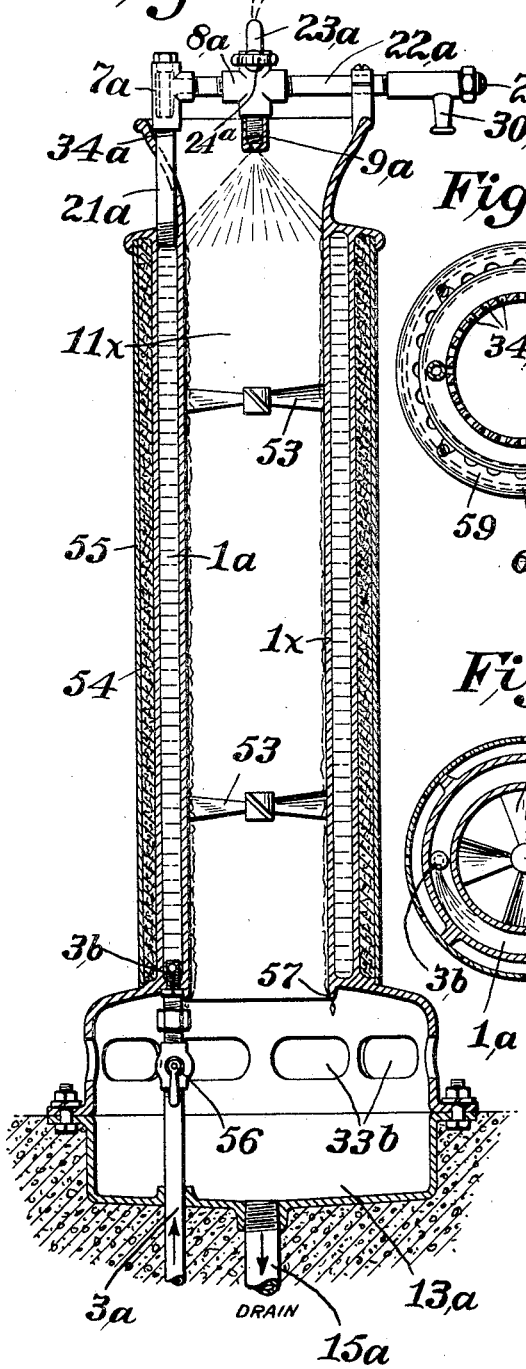
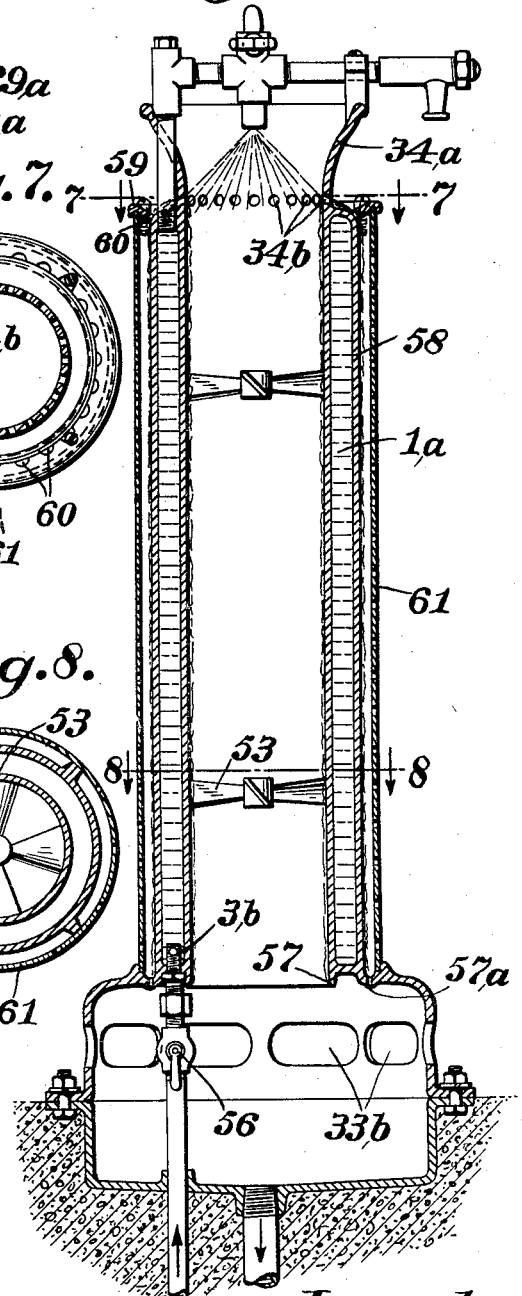
Inventor:
Edward S. Halsey,
By [signature]
Attys.

Patented Oct. 10, 1933

1,929,583

UNITED STATES PATENT OFFICE 1,929,583

APPARATUS FOR SUPPLYING COOLED DRINKING WATER

Edward S. Halsey, Glen Echo, Md.

Application July 28, 1930. Serial No. 471,297

11 Claims. (Cl. 62—154)

The invention relates to drinking fountains and consists in the features and combination and arrangement of parts hereinafter described and pointed out in the claims.

Fig. 1 is a vertical sectional view of the invention.

Fig. 2 is a detail view of a filter and spray nozzle.

Fig. 3 is a detail relating to the spray nozzle.

Fig. 4 is a side view of another form of the invention partly broken away.

Fig. 5 is a vertical sectional view of a modified form of the apparatus.

Fig. 6 is a view similar to Fig. 5 of a further modification.

Fig. 7 is a cross section on line 7—7 of Fig. 6.

Fig. 8 is a cross section on line 8—8 of Fig. 6.

Referring to Fig. 1, the numeral 1 indicates an inner container or reservoir for the cooled water surrounded by a coil 2 receiving its supply of water from the pipe 3. The coil is connected by a branch 4 with the upper part of the container at 5, and with a spray nozzle 9 by means of the branch extension 6, the strainer 7 and the small pipe section 8. The spray of water emanating from the nozzle 9 is indicated by the dot and dash lines at 10.

This spray spreads out in conical form as shown and it is arranged axially over the vertical axis of the container. The spray discharges downwardly in a fine mist and drenches the outer side of the container, its downward course being indicated by the arrows. The coil 2 which surrounds the container and through which the supply of incoming water passes to the container is also drenched by this spray water in the form of mist. The spray issues from the nozzle with considerable force and it induces a current of air passing downwardly through the space 11 within the enclosing casing 33. This current of air with the spray water passes through the opening 12 at the bottom of the casing, the water being caught by a pan 13 from which it passes through the discharge opening 14 to drain pipe 15.

The casing of the apparatus is supported upon legs 16 which rest in the pan 13 and this pan is supported by a bracket 17 attached by bolts 18 to the wall 19 or other main support. The air which is caused to pass down through the apparatus as above described by the spray escapes through the space between the bottom of the enclosing casing and the pan 13, as indicated by the arrows. At 20 there is a fitting through which the lower end of the container is connected with the delivery pipe 21 which leads to a coupling 22 surmounting which is the nozzle 23 of the drinking fountain, which includes also the cup 25 and its drain 25a. A spring pressed handle 24 controls a cock (not shown) by which the user can cause the cooled water to issue from the fountain nozzle, these parts being of well known construction, not necessary to illustrate in detail. There is also a tray at 26 for holding a drinking glass which receives water from a nozzle 30, the supply through which is controlled by a cock (not shown) operated by a handle 29 which may be spring pressed to return the cock to closed position, as soon as the user removes his hand therefrom.

31 indicates a cock by which the container 1 may be drained. The container is supported within the casing 33 by brackets 32 which hold the container centrally and spaced apart from the casing wall. The casing has an open, flared upper end 34. A drain pipe 27 leads from the tray 26 to carry waste water. 35 indicates heat insulating material on the exterior of the casing.

In the action of the apparatus the strong spray induces a draft of air and wets the exterior of the container as well as the coil 2. The air current induces evaporation of the water from the wall of the container and the coil and thus lowers the temperature of these walls with the result that the water within these parts is cooled.

Fig. 4 illustrates a modification in which those parts which are analogous to those described in connection with Fig. 1 are indicated by the same reference character with a prime mark added thereto.

In this form the lower end of the enclosing casing has an enlarged base portion 33a provided with openings 33b for the escape of the air. This base is bolted at 38 to trap 13′ which is embedded in the ground and from which leads a drain pipe 15′. The supply pipe 3′ in this modification passes upwardly through this trap.

In this modification the drinking fountain 37 with its upwardly directed nozzle 23′ is arranged coaxially with and above the container 1′ and it gets its supply of cooled water from the bottom of the container through pipe 21′, and this pipe also supplies cooled water to the supply nozzle 9′ so that the container and the coil 2′ are drenched with pre-cooled water. A spring controlled cock 36 is turned by the user when he desires to get a stream of drinkable water from the nozzle 23′. The supply coil 2′, instead of supplying the spray water as in Fig. 1, supplies only the container. It is connected thereto at 5′. Suitable supporting legs 39 are bolted at 40 to the trap. These supports are riveted to the container to hold the same in proper position and these supports have hooked ends 41 which support parts of the coil 2'. Other supports 42 are attached to the container and hold the coil 2'.

Fig. 2 indicates a strainer at 43 within a casing 7' which strains the water on its way to the spray and drinking nozzle.

In Fig. 5 is shown a modification in which the main body of the apparatus is at 1x cored out at 1a to form a water container to which the water is supplied through a pipe 3a. The casting has a central chamber 11x open at its upper and lower ends and separated from the water containing chamber by the comparatively thin wall of the casting. Axially of the upper end of this central chamber is the spray nozzle 9a which receives its supply through pipe 21a from the water chamber 1a.

The nozzle depends from a fitting 8a on a cross pipe 22a which is connected with a filter casing indicated generally at 7a with which the pipe 21a connects. The fitting 8a has an upwardly directed nozzle 23a from which the user gets the drinking water, and there is a connection 22a leading to a faucet 30a operated by a push button 29a.

A suitably controlled valve 24a is at the bubble fountain 23a.

The interior of the casting is provided with deflectors 53 which give the spray and air a whirling motion. Outside the cast shell there is insulation at 54 and a casing 55 surrounds this insulation. An inlet valve is arranged at 56. The casting is provided with an upwardly flaring flange 34a extending above the main body, which contains the water chamber.

The drip from the inner wall of the casing passes from the flange 57 into the trap 13a and to the drain pipe 15a.

In Fig. 6 is shown an apparatus like that in Fig. 5, excepting that the upwardly extending flange 34a is perforated at 34b to allow a portion of the spray water to pass through to the outer side of the main casting so as to drench the outside of the outer wall 58 of the water chamber 1a.

There is an outwardly and upwardly extending flange at 59 forming a gutter which receives spray water through the perforations 34b. This flange is serrated at 60 so that the spray water can pass the flange to drench the said outer wall 58 of the casting on its outer side. We thus get spray water drenching both the outer and inner surfaces or walls of the water container 1a, thus increasing the cooling effect.

There is a guard 61 on the outside and spaced apart from the outer wall of the casing. This guard is perforated for the passage of air so that heat may pass away from the casting. The guard will prevent contact of the clothing of the user with the wet exterior surface of the main body or casting of the apparatus. Like in the forms first described, the current of air with evaporation passes out at the lower end of the apparatus through openings at 33b.

Drip escapes are shown at 57 and 57a in this modification.

A coil for the supply water may be employed in the forms shown in Figure 5 arranged inside the casting so that the spray water will drench the same, and in Figure 6 a water supply coil may be used either inside or outside the casting or both.

The nozzle is shown in Fig. 2 and comprises a tube 47 screw threaded into the fitting 8'. This tube at its lower end is provided with a port 49 shown by dotted lines in Fig. 3 extending through the wall to discharge the water onto a spiral formation indicated at 50. This directs the water in a spiral course to finally issue at the opening 52 in the bottom of a cap member 9' which incloses the end of the nozzle and has a tapered chamber 51. This cap 9' is screw threaded onto the tubular nozzle 47.

The tapered chamber 51 tapers downwardly and in this space 51 a vortex is set up owing to the spiral course that the water has attained on leaving the nozzle member and the water finally issues at the opening 52 in the form of a spray, indicated at 10.

When any feature shown in connection with one form is susceptible of use with another of the forms described, it is to be considered as belonging in that form, though not shown or described in connection therewith.

In Figs. 5 and 6 I indicate an inlet nozzle having a lateral discharge opening 3b to give a swirling motion to the water within the annular water chamber.

I claim:

1. An apparatus for supplying cooled drinking water, comprising a container and an air passage having a wall common to both, a flared casing wall above the container and forming the entrance to the air passage, a delivery connection leading from the container, a water supply connection for the container, and means including a jet for forming and delivering a spray of water to said air passage and directly onto the common wall to effect the drenching of said wall, said jet being located coaxially within the flared entrance to the air passage, to cause air to circulate through said passage.

2. Apparatus according to claim 1 in which the spray nozzle is connected with the container to receive the cooled water therefrom.

3. An apparatus for supplying cooled drinking water, comprising a container and an air passage having a wall common to both, a delivery connection leading from the container, a water supply connection for the container, means for forming and delivering a spray of water to said air passage to effect the drenching of said wall and to cause air to circulate through said passage, a coil associated with the container, and means connected to said coil for supplying water to both the container and spray means, said coil being drenched by the spray means, substantially as described.

4. Apparatus according to claim 3 in which the water supply coil connects with the upper end of the container and the water for supplying the spray extends from the lower end of the container substantially as described.

5. Apparatus according to claim 1 in which the container is of annular form providing the air chamber at its center, open to atmosphere at top and bottom, the spray means being located at the upper end of the container and drenching both the inner and outer sides thereof.

6. Apparatus according to claim 1 in which the container is of annular form providing the air chamber at its center, open to atmosphere at top and bottom, the spray means being located at the upper end of the container and drenching both the inner and outer sides thereof, said container having an upwardly extending flange within which the spray means is located, said flange being perforated for the passage of some of the spray water therethrough to drench the outer wall of the container.

7. Apparatus according to claim 1 in which the container is of annular form providing the air chamber at its center, open to atmosphere at top and bottom, the spray means being located at the upper end of the container and drenching both the inner and outer sides thereof, said container having a flange at its upper end perforated for the flow of some of the spray water, and a flange forming a gutter surrounding the upper end of the container to receive the spray water and having distributing openings to lead the water to drench the outer side of the container substantially as described.

8. Apparatus according to claim 1 in which the container is of annular form providing the air chamber at its center, open to atmosphere at top and bottom, the spray means being located at the upper end of the container and drenching both the inner and outer sides thereof, and a guard on the exterior of the container for preventing contact of the user with the wet exterior wall of the container substantially as described.

9. In a drinking fountain of the class described, in combination, an upstanding columnar structure rising directly from a ground base, incorporating a cooled water reservoir, a water pressure supply connection ascending to said reservoir, a drinking water outlet from the reservoir at the top of said structure, a constant means of drenching the outer surface of said reservoir from the top downwardly, means for collecting and diverting waste water at the bottom to a drain, and an apertured screen completely surrounding said reservoir, adapted to allow the air to pass freely through it to the wet surface of said reservoir from all directions.

10. An apparatus for supplying cooled drinking water, comprising a container, a delivery connection leading from the container, a water supply connection for the container, and means receiving cooled water from the container and forming it into a spray and directing the spray onto the container to drench a wall thereof.

11. Apparatus according to claim 10 in which the container has associated therewith a coil through which the supply water for the apparatus flows, said coil being drenched by the spray, substantially as described.

EDWARD S. HALSEY.